J. BROMLEY.
APPARATUS FOR BOILING SUGAR-CANE.
No. 192,483. Patented June 26, 1877.
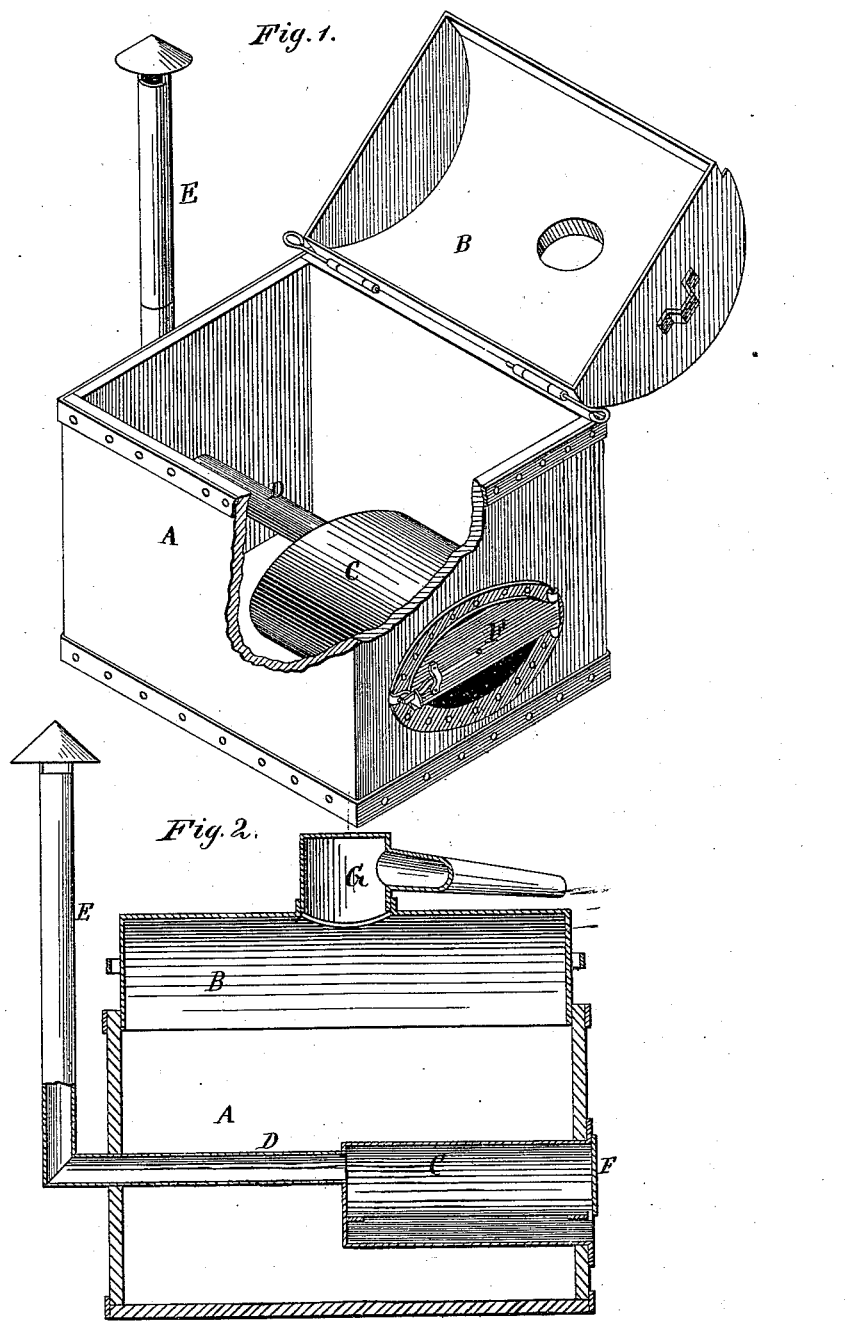
WITNESSES
Henry N. Miller
Joseph G. Wildman
INVENTOR
John Bromley,
Alexander Mason
ATTORNEY

UNITED STATES PATENT OFFICE.

JOHN BROMLEY, OF MACON, ASSIGNOR OF A PART OF HIS RIGHT TO SARAH ELLEN SMITH AND JESSE MOSELY ELLIS, OF ATLANTA, GEORGIA.

IMPROVEMENT IN APPARATUS FOR BOILING SUGAR-CANE.

Specification forming part of Letters Patent No. 192,483, dated June 26, 1877; application filed December 14, 1876.

*To all whom it may concern:*

Be it known that I, JOHN BROMLEY, of Macon, in the county of Bibb, and in the State of Georgia, have invented certain new and useful Improvements in Apparatus for Boiling Sugar-Cane; and do hereby declare that the following is a full, clear, and exact description thereof, reference being had to the accompanying drawings, and to the letters of reference marked thereon, making a part of this specification.

The nature of my invention consists in the construction and arrangement of a combined boiler and still for boiling the juice of sugar-cane, beets, maple, watermelon-juice, and other suitable substances into sirup, as will be hereinafter more fully set forth.

In order to enable others skilled in the art to which my invention appertains to make and use the same, I will now proceed to describe its construction and operation, referring to the annexed drawing, in which—

Figure 1 is a perspective view of my invention. Fig. 2 is a longitudinal vertical section of the same.

A represents a tank or boiler, of any suitable dimensions, made of two-inch oak plank, strongly put together with bolts or otherwise.

B is the cover, made of copper, and hinged to one side of the tank or boiler.

Within the boiler, at a suitable height above the bottom thereof, is a heater, C, opening at one end of the boiler, and provided with the door F. From the inner end of the heater C extends the flue-pipe D through the opposite end of the boiler to the smoke-stack E.

In the center of the cover B is an opening, with projecting collar for the attachment of a cap, G, to attach a worm in stilling.

The cover B is thrown back when skimming, and the cap G is taken off altogether when not desired to still, and the sirup-boiler is still complete.

The heater and flue-pipe are both inside of the boiler, and hence a very great saving of fuel is effected.

This apparatus is applicable for boiling the juice of sugar-cane, sorghum, beets, the sap or juice of the maple and watermelons, and any other purpose that it can be used for.

Having thus fully described my invention, what I claim as new, and desire to secure by Letters Patent, is—

The combination of the wooden case A, provided with door F, heater C, and flue D, and hinged cover B, provided with the removable cap G and pipe, all constructed substantially as and for the purposes herein set forth.

In testimony that I claim the foregoing I have hereunto set my hand this 7th day of December, 1876.

JOHN BROMLEY.

Witnesses:
ALECK BLOCK,
J. MONROE OGDEN.